H. A. HILLS.
HYDROCARBON FILTER.
APPLICATION FILED JULY 28, 1916.
1,328,044. Patented Jan. 13, 1920.
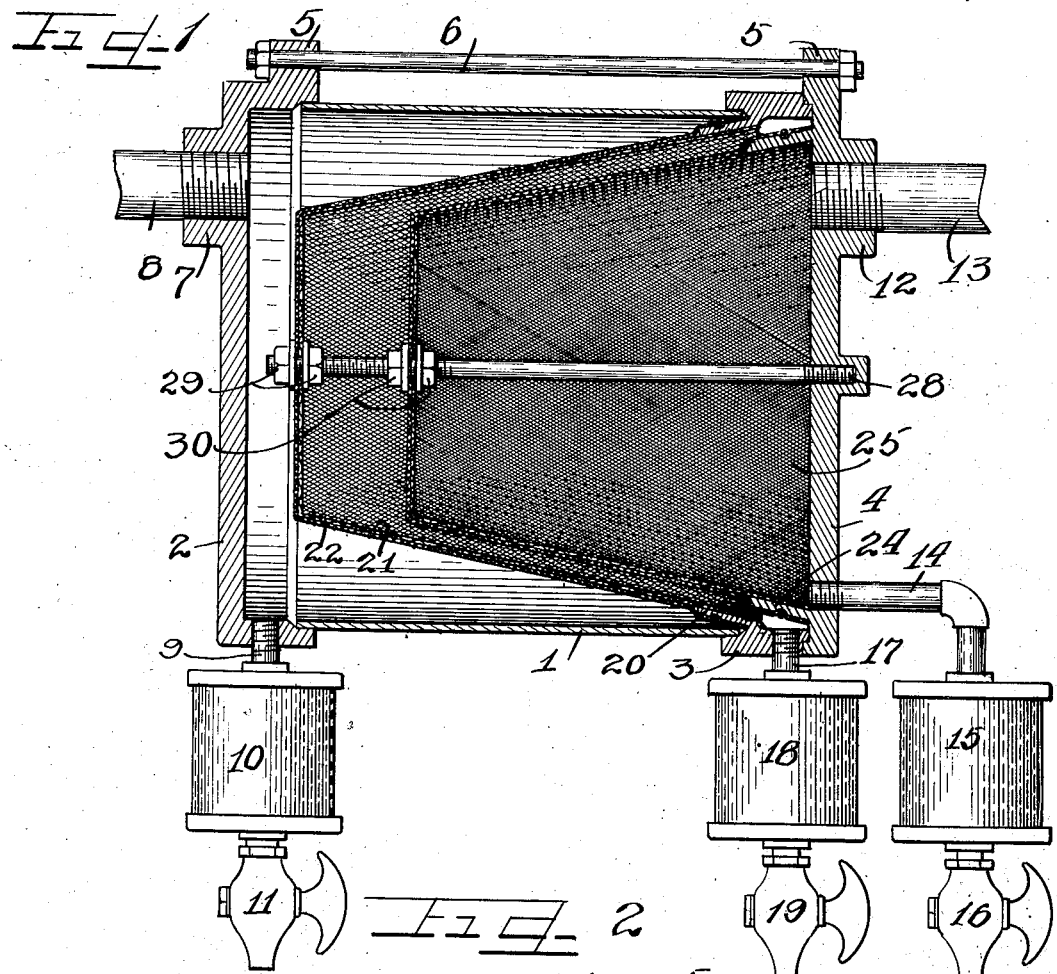
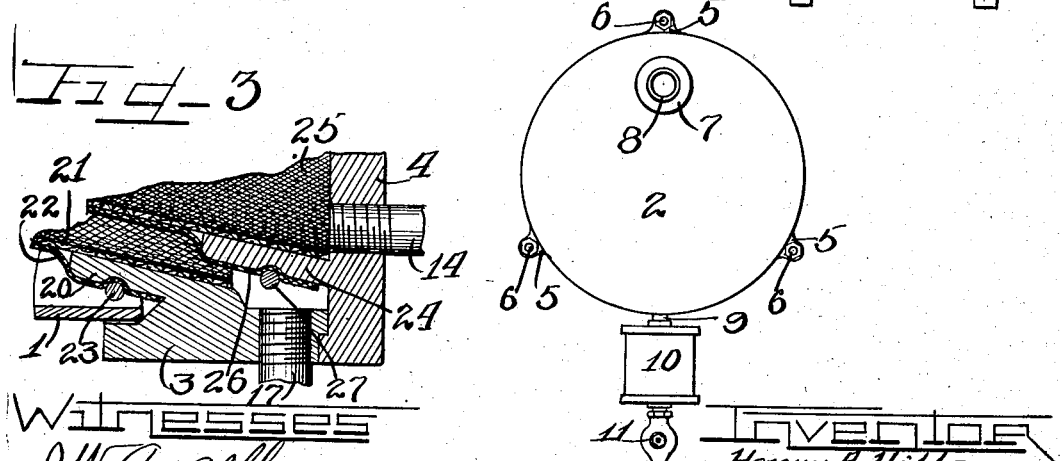
Witnesses
J. W. Angell
Charles Pillag
Inventor
Henry A. Hills
by Charles Nill
Atty

UNITED STATES PATENT OFFICE.

HENRY A. HILLS, OF GRAND RAPIDS, MICHIGAN.

HYDROCARBON-FILTER.

1,328,044. Specification of Letters Patent. Patented Jan. 13, 1920.

Application filed July 28, 1916. Serial No. 111,907.

*To all whom it may concern:*

Be it known that I, HENRY A. HILLS, a citizen of the United States, and a resident of the city of Grand Rapids, in the county of Kent and State of Michigan, have invented certain new and useful Improvements in Hydrocarbon Filters; and I do hereby declare that the following is a full, clear, and exact description of the same, reference being had to the accompanying drawings, and to the numerals of reference marked thereon, which form a part of this specification.

Gasolene or benzin which is used in commercial processes, particularly in cleaning and other industries, becomes more or less impure by the addition thereto of a certain percentage of moisture, making the hydrocarbon wet, a condition which, for many reasons, is undesirable. Then, too, among the many different grades of hydro-carbons upon the market some contain a fairly large percentage of water which must be removed before the hydro-carbon may be used with any desirable or satisfactory results.

This invention relates to a filter of improved construction adapted to effectually remove water and other impurities from a hydro-carbon without seriously impeding the flow of hydro-carbon through the device, and in a manner to permit the impurities removed to be drawn off as collected.

It is an object therefore of this invention to construct a filter adapted to permit ready passage therethrough of a fluid and acting to remove water and other impurities therefrom during the passage therethrough.

It is also an object of this invention to construct a filter for oil to remove water therefrom comprising a drum with a plurality of filtering elements arranged therewithin to cause passage of the oil therethrough and permitting the various compartments within said drum formed by said filtering elements to be drained to remove the collected impurities and water therefrom.

It is also an important object of this invention to construct an improved type of filter wherein the filtering elements are mounted within a drum attached upon one of the heads or ends of the drum to permit ready withdrawal therefrom as a unit and disassembly thereof for cleaning or repair.

It is furthermore an important object of this invention to construct an improved type of filter wherein the filtering elements are mounted on one end of a drum, and removable and capable of being withdrawn therefrom as a unit and detached for cleaning or repair, and with the drum and the ends thereof so constructed as to receive connected thereinto small receptacles to receive the impurities removed from fluid passed through the drum from the various compartments afforded therein by the filtering elements.

It is finally an object of this invention to construct a simple and improved type of filter easy to install and readily cleaned and repaired, and operating efficiently to remove water and other impurities from a fluid passed therethrough.

The invention (in a preferred form) is illustrated in the drawings and hereinafter more fully described.

In the drawings:

Figure 1 is a longitudinal central vertical section taken through a filter embodying the principles of my invention with parts shown in elevation.

Fig. 2 is an end view thereof.

Fig. 3 is a fragmentary detail section at the lower end of the device.

As shown in the drawings:

The device consists of a drum 1, preferably of sheet metal, and fitted over one end thereof is a head 2, and over the other end thereof is a ring or annulus 3, and fitted over the recessed edge of said ring 3, is a head 4. Formed on the periphery of said respective heads 2 and 4, are outstanding apertured lugs 5, through which longitudinally disposed assembly tie rods or bolts 6, are fitted, to draw the heads 2 and 4, toward one another clamped upon the drum 1. A boss 7, is formed upon the head 2, of the drum and has an aperture therethrough through which an inlet pipe 8, is threaded, and on the lower side of said head 2, a draw-off pipe 9, is threaded through the flange thereof and has connected thereon a glass sight chamber 10, provided with a pet-cock 11. A similar boss 12, is formed upon the head 4, and threaded through an aperture or passage therein is an outlet pipe 13.

Communicating through another threaded aperture in the head 4, is a draw-off pipe 14, to which is connected a sight chamber 15, provided with a pet-cock 16. Likewise communicating through a threaded aperture in the annulus or ring 3, is a draw-off pipe 17, to which is connected a sight chamber 18, also having a pet-cock 19. Filtering elements are mounted within the drum, one set upon the head 4, and the other set upon the annulus 3, thus permitting detachment and removal thereof one from another. For this purpose the annulus 3, is provided with an inwardly directed convergent or conical flange 20, and fitting wedgingly therein contacting the inner surface thereof is a wire net or filtering screen 21, frusto-conical in shape and extending to near the end 2, of the drum, and stretched over the outer surface of said frusto-conical screen is a specially treated fabric covering 22, such as canton flannel or the like. The margin of said fabric covering 22, is drawn around the flange 20, and is held secured thereagainst, as clearly shown in Fig. 3, by a contracting ring 23, sprung therearound pressing a portion of the margin of the fabric into a groove or recess formed peripherally around said flange 20.

Formed on the inner surface of the head or end 4, is a circular inwardly convergent or conical flange 24, and fitted therewithin is a frusto-conical screen or wire netting 25. A closely woven or knit textile fabric investment or covering 26, is fitted around the outer surface of said frusto-conical screen 25, and at its margin is drawn over the flange 24, and held attached thereon by a contracting ring 27, which presses the portion of the margin of the fabric into a groove in said flange provided for the purpose. A central axial reinforcing means for said respective screens 21 and 25, is provided, consisting of a rod 28, threaded into the head or end 4, and extending through apertures provided in the flat forward surfaces of said respective screens, and the forward end of said rod is threaded and engaged thereon are pairs of clamping nuts 29 and 30, respectively, which clamp against the inner and outer sides of said respective filtering elements to properly position and support the same.

The fluid to be filtered is admitted into the device through the pipe 8, and flows into the drum 1, surrounding the outer filtering element 21—22, and percolates therethrough surrounding the inner filtering element 25—26, and after percolating therethrough leaves the device at the upper end through the outlet pipe 13. The two filtering elements disposed within the drum divide the same subtantially into three compartments, the outermost into which the fluid to be filtered enters, an intermediate compartment between said respective filtering elements, and the inner compartment within the inner filtering element. Draw-off pipes and sight chambers are provided for each of said compartments mounted on the lower side of the drum, as clearly shown in Fig. 1, the sight chamber 10, communicating with the outer chamber within the drum, the sight chamber 18, with the intermediate chamber within the drum, and the sight chamber 15, with the inner chamber within the drum, so that samples may be taken of the fluid in the progress of filtration through the device, and furthermore impurities collected in any of said compartments and draining to the lower end thereof such as water and dirt or rust (when filtering gasolene) may be drawn off therethrough. The construction of the device permits ready removal of the filtering elements as an entire unit by merely detaching the nuts on the long bolts 6, and withdrawing the head 4, and annulus 3, after which the nuts 29 and 30, respectively, on the central axial rod 28, may be detached, permitting the respective filtering screens and the treated fabric thereon to be removed from one another for cleaning, replacement, or repair.

I am aware that various details of construction may be varied through a wide range without departing from the principles of this invention, and I therefore do not purpose limiting the patent granted otherwise than necessitated by the prior art.

I claim as my invention:

1. In a filtering device, the combination of a casing, having an inlet and an outlet, a plurality of filtering elements intermediate of the inlet and outlet dividing the casing into successive compartments and a plurality of receptacles connected at the bottoms of said compartments and provided with transparent walls and a valved drainage outlet from each receptacle.

2. In a filtering device the combination of a casing, having an inlet and an outlet, a plurality of frusto-conical filtering elements nested one within the other in horizontal series so as to divide the casing into a plurality of successive compartments intermediate of the inlet and the outlet, a plurality of receptacles connected at the bottoms of said compartments, said receptacles being provided with transparent walls for viewing the contents of the receptacle and a draw-off valve for each receptacle.

3. A device of the class described comprising a drum, a pair of frusto-conical filtering elements disposed therein and mounted on one end thereof, a rod extending axially through the elements, means rigidly securing each element to the rod, an inlet and an outlet for said drum, the one disposed to introduce fluid into the drum for passage through said filtering elements and the other disposed to receive the filtrate therefrom, and detachable independent means on which said respective filtering elements are mounted permitting ready removal thereof one from another.

4. A filter of the class described comprising a drum, detachable heads thereon, an annulus clamped between the ends of said drum and one of said heads, frusto-conical filtering elements disposed within said drum, a flange formed on said annulus affording a support for one of said filtering elements, a flange formed on one of said heads affording a support for another of said filtering elements whereby the same are arranged concentrically with respect to one another, and means disposed centrally within the drum and attached to said latter detachable head, to space and support said filtering elements within the drum.

5. A filtering device of the class described comprising a drum, a detachable head thereon, an annulus clamped between said drum and head, and a plurality of filtering elements mounted in said drum, one secured to the annulus and the other to said head, and detachable as a unit together with said annulus and head from the drum.

6. A filter comprising a plurality of heads, a drum, an annulus adapted to be clamped between one head and the drum, concentrically arranged filter drums, means secured to one of the heads extending through the filtering drums to the other head, said filter drums providing a plurality of chambers and an independent valve communicating with each chamber.

7. A filter of the class described comprising a drum cylinder, detachable heads on each end thereof, exterior bolts connecting said heads one to another to clamp the same on said drum cylinder, an annulus clamped between one of said heads and the end of said drum cylinder, inwardly directed flanges on said latter head and said annulus, frusto-conical filtering screens fitted on said respective flanges and of different size and spaced one from another in concentric relation, and axially disposed means secured to said latter head and engaging the outer ends of each of said filtering elements to properly space and support the same.

8. In a filtering device the combination of an elongated filter element, a casing inclosing said filter element and having an inlet adjacent one end of the filter element and an outlet adjacent the other end thereof, and a receiver for impurities at the outlet end of the casing arranged so that the flow of filtered fluid washes the impurities to said receiver.

9. In a filtering device the combination of a plurality of elongated tubular filter elements nested one within the other, a casing inclosing the filter elements and having an inlet and an outlet arranged to maintain a flow of fluid lengthwise of said filter elements, and a compartment for impurities at the outlet end of each of the filter elements arranged so that the fluid filtered by said element flows over the said compartment.

10. In a filtering device the combination of a casing having an inlet and an outlet and a detachable head, a plurality of filtering elements in the casing intermediate of the inlet and outlet dividing the casing into a plurality of successive compartments, a plurality of receptacles for impurities each adapted to communicate with one of the compartments formed by the filtering elements in the casing, each of said receptacles being accessible by removing the detachable head.

11. In a filtering device the combination of a casing having a plurality of tapered tubular filtering elements nested one within the other to provide an annular compartment therebetween, and a receptacle for impurities connected with the expanded end of said compartment.

12. In a filtering device the combination of a casing having a plurality of tapered tubular reticulated members nested one within the other and separating the casing into a plurality of successive compartments, a filter cloth on the outer surface of each of said elements, an inlet for supplying the fluid to be filtered to the outer surface of the first member and an outlet for withdrawing the filtered fluid from the interior of another of the members and an outlet for impurities at the bottom of each compartment.

In testimony whereof I have hereunto subscribed my name in the presence of two subscribing witnesses.

HENRY A. HILLS.

Witnesses:
   CHARLES W. HILLS, Jr.,
   EARL M. HARDINE.